W. T. RUTH.
CENTERING MACHINE.
APPLICATION FILED MAY 12, 1908.
943,467.
Patented Dec. 14, 1909.
3 SHEETS—SHEET 1.
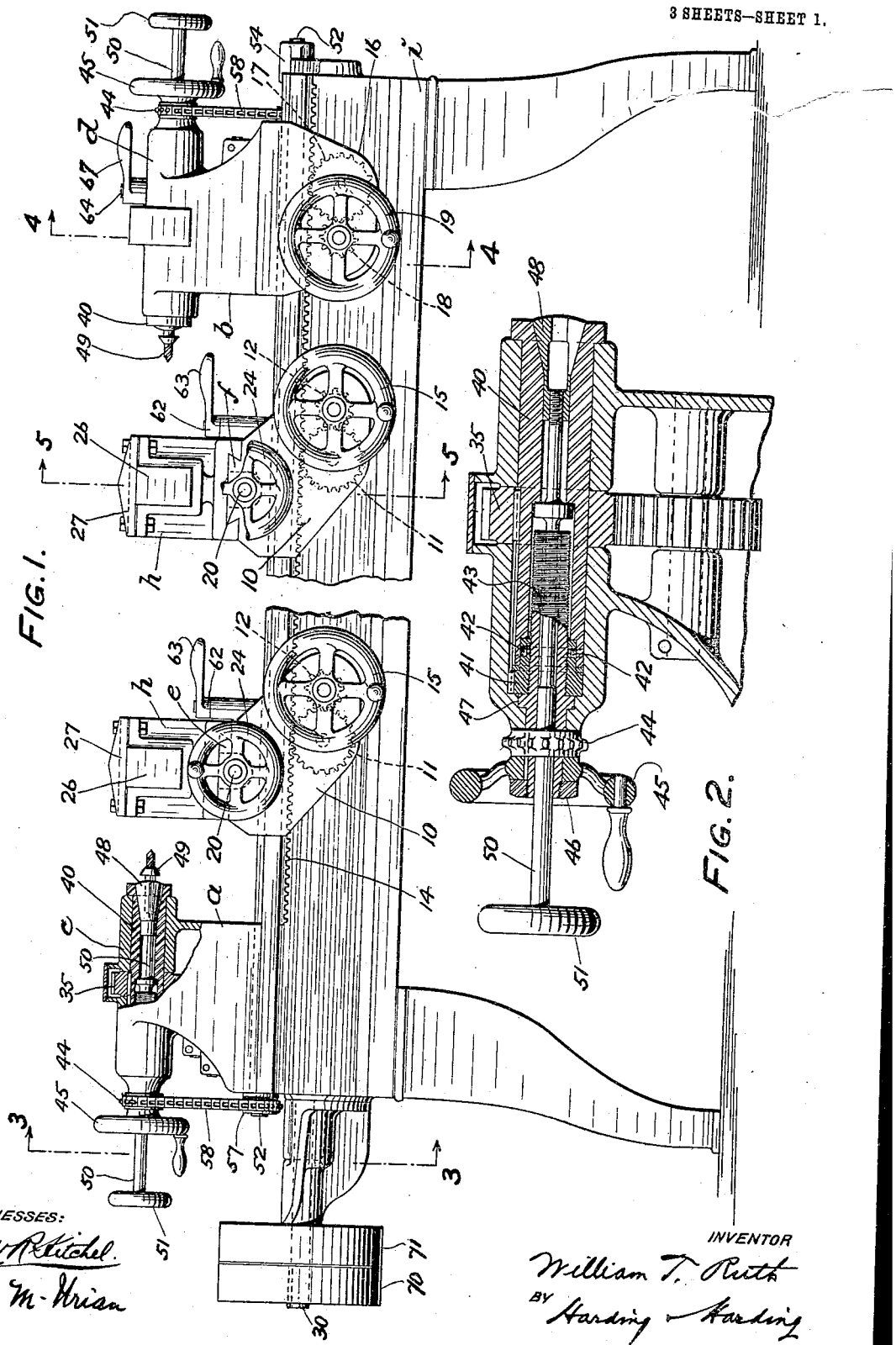
WITNESSES:
Rob R Kitchel
A. M. Hrian
INVENTOR
William T. Ruth
BY Harding & Harding
ATTORNEYS.

W. T. RUTH.
CENTERING MACHINE.
APPLICATION FILED MAY 12, 1908.

943,467.

Patented Dec. 14, 1909.
3 SHEETS—SHEET 3.

WITNESSES:

INVENTOR
William T. Ruth
BY
Harding & Harding
ATTORNEYS.

UNITED STATES PATENT OFFICE.

WILLIAM T. RUTH, OF KENNETT SQUARE, PENNSYLVANIA, ASSIGNOR TO THE AMERICAN ROAD MACHINE COMPANY, OF KENNETT SQUARE, PENNSYLVANIA, A CORPORATION OF PENNSYLVANIA.

CENTERING-MACHINE.

943,467.  Specification of Letters Patent.  Patented Dec. 14, 1909.

Application filed May 12, 1908. Serial No. 432,442.

*To all whom it may concern:*

Be it known that I, WILLIAM T. RUTH, a citizen of the United States, residing at Kennett Square, county of Chester, and State of Pennsylvania, have invented a new and useful Improvement in Centering-Machines, of which the following is a full, clear, and exact description, reference being had to the accompanying drawings, which form a part of this specification.

The object of my invention is to provide a machine for simultaneously drilling the opposite ends of a shaft, axle, or other metallic piece circular, square, or irregular, in cross-section, on the line of its axis, for the purpose of preparing it for subsequent turning on a lathe.

Figure 4:
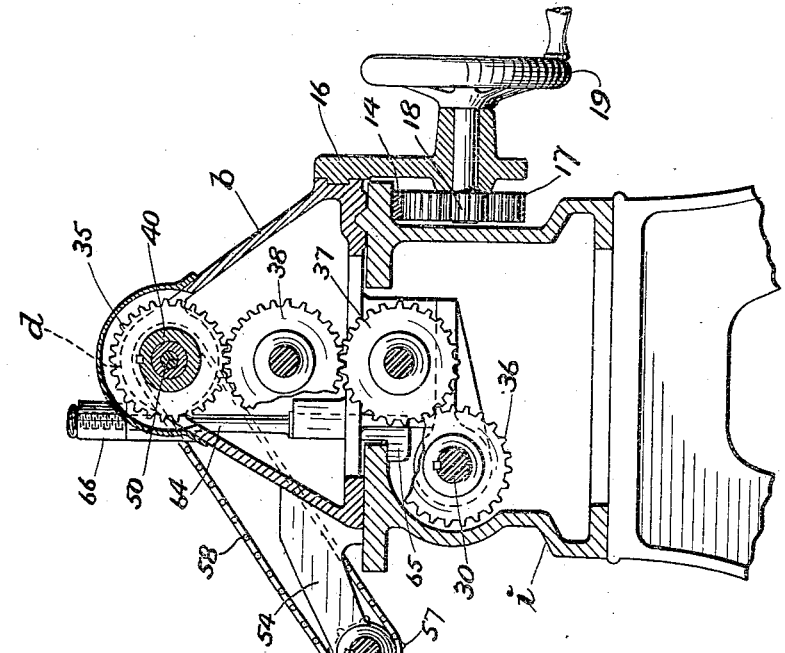
Figure 3:
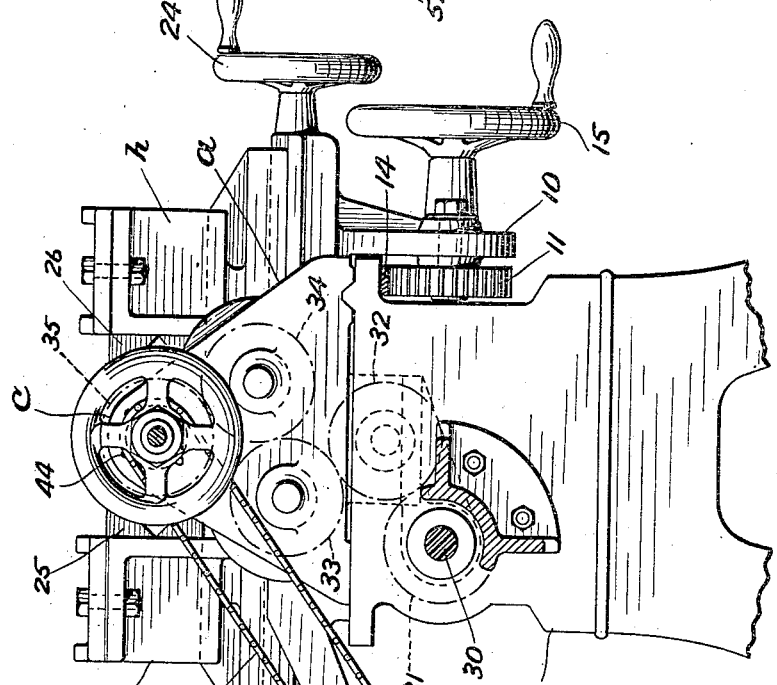
Figure 5:
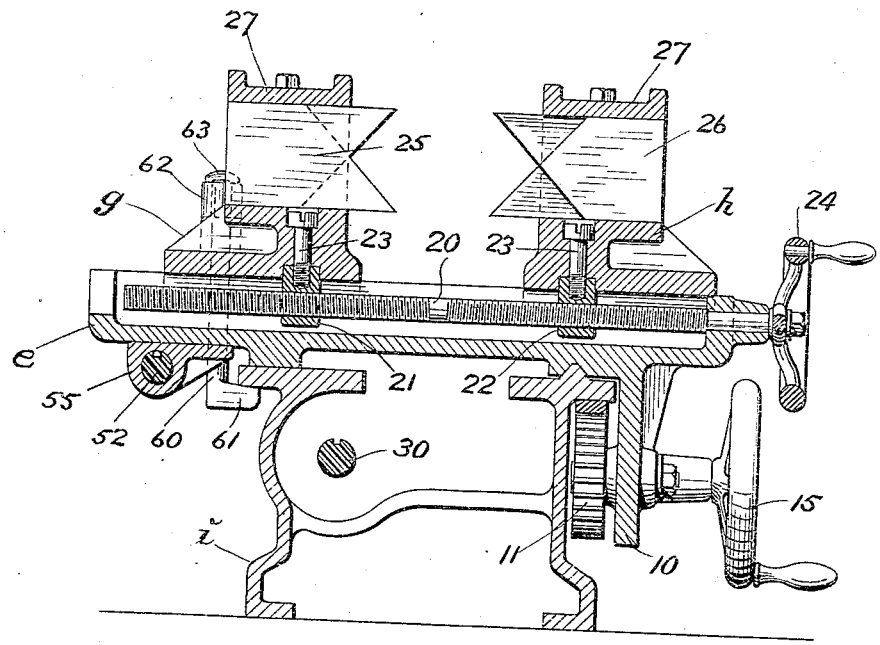
Figure 6:
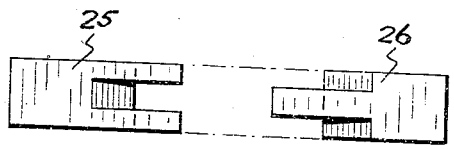

In the drawings: Figure 1 is a front elevation of the machine. Fig. 2 is a longitudinal section through one of the drill-heads. Figs. 3, 4 and 5 are sections on the lines 3—3, 4—4 and 5—5 respectively of Fig. 1. Fig. 6 is a plan view of the jaws.

The machine illustrated comprises a pair of carriages $a$, $b$, carrying the drill-heads $c$, $d$, respectively, a pair of carriages $e$, $f$, carrying the centering jaw-holders and located between the drill-head carriages, and a frame $i$ on which the jaw-holder carriages and one of the drill-head carriages are longitudinally movable. Each carriage $e$ or $f$ has depending from it a bracket 10 carrying bearings for the shafts of intermeshing gears 11 and 12. The gear 11 meshes with a longitudinally extending rack 14 on the frame $i$. A hand-wheel 15 is mounted on the shaft of gear 12. By turning the hand-wheel 15, the carriage is moved longitudinally along the frame $i$. The carriage $b$ carrying the drill head $d$ has a depending bracket 16 having bearings for the shafts of the intermeshing gears 17 and 18. Gear 17 meshes with the rack 14. By means of a hand-wheel 19 on the shaft of gear 18, the carriage $b$ is moved longitudinally along the frame.

In bearings on each carriage $e$ or $f$ turns a horizontal shaft 20 extending transversely of the frame $i$. This shaft is provided with right and left hand threaded sections engaging respectively nuts 21 and 22, which depend respectively from the jaw-holders $g$ and $h$ and are secured thereto by means of screws 23. The jaw-holders $g$ and $h$ are movable transversely upon the carriage $e$ or $f$ and are moved toward or away from each other by turning the shaft 20 by means of the hand-wheel 24 secured thereto.

In drilling work that is eccentric or irregular in cross-section, one of the screws 23 is disengaged and the corresponding nut 21 rotated, thus moving the corresponding jaw holder toward or from the axial line of the drills, after which the set screw is again engaged.

The jaw-holders $g$ and $h$ each comprise a base and side plates extending upwardly therefrom and adapted to receive between them a centering jaw, the holder $g$ carrying the jaw 25 and the holder $h$ the jaw 26. The side plates are flanged at the top and a cap 27 overlies said flanges and the jaw and is bolted to the flanges so as to hold the jaw securely in place. The opposing faces of the jaws 25 and 26 are respectively male and female and their projecting parts are V-shaped. This construction and arrangement of the jaws enable them to fit different sized work within wide limits. To place a shaft in the machine, the jaw-holder carriages are moved along the frame until they are a distance apart suitable to support the opposite ends of the shaft, and the jaw-holders are then moved toward each other until the jaws firmly clamp the shaft.

The carriage $a$ is fixedly mounted on the frame and carries bearings for the driving shaft 30 and for the shafts of gears 32, 33 and 34.

35 is a gear surrounding and splined to the sleeve 40 rotatable in each drill-head $c$ or $d$.

Splined on the driving shaft 30 is a gear 31. Rotation of the driving shaft 30 imparts rotation to the sleeve 40 of drill-head $c$ through the chain of gears 31, 32, 33, 34, 35.

The carriage $b$ is movably mounted on the frame and carries bearings for the driving shaft 30 and for the shafts of gears 37 and 38. The latter meshes with the gear 35 on sleeve 40 of drill-head $d$. On the driving shaft is a gear 36. Rotation of the driving shaft 30 imparts rotation to the sleeve 40 of drill-head $d$ through the chain of gears 36, 37, 38, 35. It will be observed that the arrangement is such that the drill-heads are simultaneously rotatable from the same driving shaft but rotatable in opposite directions owing to the different arrangements of the gears for driving the two drill-heads. The rotatable sleeve 40 of each drill-head is recessed interiorly near its inner end to receive the contracted front part of a nut 41 whose rear part is held from turning in, but is allowed to move longitudinally of, the drill-head by engaging a spline or key on the interior of the drill-head. The sleeve 40 is held in fixed relation to the nut 41, so far as concerns longitudinal movement in the drill-head, by means of pins 42 on the sleeve engaging an annular recess in the nut.

Extending within the nut 41 and sleeve 40 is an interior threaded sleeve or hollow shaft 43 engaging the nut 41. Keyed to the part of the sleeve 43 projecting back of the drill-head are sprocket-wheel 44 and a hand-wheel 45, which are secured in place by means of an end nut 46. The sleeve 43 is held from movement rearwardly in the drill-head by means of an annular rib 47 thereon abutting against a shoulder formed near the rear end of the drill-head. By rotating the sleeve 43 by means of the hand-wheel 45, the nut 41 is fed forwardly in the drill-head, thereby feeding forwardly the sleeve 40.

Extending within the forward end of the sleeve 40 is the collet 48 for holding the drill 49. The inner end of the collet is threaded and engages the forward end of a threaded shaft 50, which extends back within and beyond the sleeve 43 and carries at its rear end the hand-wheel 51. By turning the shaft 50, the collet 48 is either advanced and loosened, permitting the drill to be removed, or it is retracted and tightened to securely hold the drill in position.

52 is a splined counter-shaft extending through and supported on brackets 53, 54, 55, on the carriages a, b, e, f. This shaft carries near its opposite ends the sprocket wheels 57, 57, which are connected to the sprocket wheels 44, 44, of the two drill-heads by means of sprocket chains 58, 58. By turning the hand-wheel 45 of either drill-head c or d, so as to feed forward the corresponding drill, a similar feed is imparted to the other drill through the sprocket wheels 44, 44, sprocket chains 58, 58, sprocket wheels 57, 57, and counter-shaft 52.

To clamp each movable carriage e or f in position, the following construction is provided. A vertical bolt 60 extends through a lug on the carriage and has at its lower end a projection 61 having an inclined upper face. To the upper end of the bolt 60 is secured a head 62 overlying the lug on the carriage and provided with an arm 63. By means of the arm 63 the bolt 60 may be turned so as to bring the projection 61 under the top plate of the frame i, thereby drawing down the carriage tightly on the frame.

The movable carriage b is clamped to the frame by a similar contrivance.

64 is a vertically-extending bolt having a hook 65 at its lower end extending under the top plate of the frame i. The upper end of the bolt 64 extends through a lug on the carriage and is threaded to receive a nut 66 overlying this lug. By means of an arm 67 secured to the nut 66, the latter may be rotated, thereby drawing up the bolt and causing its hooked end to bear firmly against the top plate of the carriage.

In operation, the drills are first secured to their corresponding drill-heads by operating the hand-wheels 51, 51. The carriages e, f are then moved by means of hand-wheels 15, 15, to positions on the frame i that will enable them to properly support the piece to be drilled. The piece is then brought into position so that one end rests against the drill carried by the drill-head c. The jaw-holders g and h of each carriage e and f are then advanced by turning the shaft 20 until the piece is securely clamped between the jaws, the shapes of which are such as to automatically center the piece with respect to the drills. The carriage b is then moved along the frame i, by turning the hand-wheel 19, until the drill carried by the drill-head d contacts with the other end of the piece. By shifting the belt from the idle pulley 71 to the driving pulley 70, the main driving shaft 30 is rotated, thereby rotating the drills carried in the sleeves 40 of the two drill-heads in opposite directions. By turning the hand-wheel 45 of either drill-head, the drills are advanced.

By means of the foregoing mechanism, the piece to be drilled is automatically centered, and the ends thereof simultaneously drilled.

Having now fully described my invention, what I claim and desire to protect by Letters Patent is:—

1. The combination, with the drill head, of a non-rotatable nut slidable thereon, a rotatable sleeve slidable on the drill head and with said nut, a rotatable and non-slidable shaft on which said nut is threaded, and means to independently rotate the sleeve and threaded shaft.

2. The combination with a carriage, of a drill-head thereon, a tool-holding sleeve within the drill-head, a threaded shaft within said sleeve, means engaging the drill-head, sleeve and shaft to convert the turning movement of the shaft into a longitudinal movement of the sleeve, means to turn said shaft and means to rotate said sleeve.

3. The combination with a frame, of a carriage mounted thereon, a drill-head mounted on the carriage, a sleeve rotatable within the drill-head, a gear splined on the sleeve, a driving shaft, driving connections from the driving shaft to the gear whereby the sleeve is rotated, a threaded shaft within the sleeve, a nut threaded on the shaft, provided with an annular groove, and longitudinally movable in a key-way on the drillhead, a pin on the sleeve engaging the nut, and means to rotate the threaded shaft.

4. The combination with the drill head, of a rotatable and slidable sleeve carried thereby, a rotatable and non-slidable sleeve also carried thereby and extending within the first sleeve, a slidable and non-rotatable nut threaded on the second sleeve and connected to the first sleeve so as to permit the latter to rotate, but not to slide, relatively to the nut, a collet inserted in the forward end of the first sleeve, a shaft extending through both sleeves and engaging the collet, a driving shaft, connections therefrom to the first sleeve, means to rotate the second sleeve, and means to rotate said shaft.

5. The combination with a carriage, of a drill-head thereon, a rotatable sleeve within the drill-head, a hollow threaded shaft within said sleeve, a nut on said shaft held from rotation with respect to said drill-head, means connecting the nut and sleeve whereby the sleeve partakes of the longitudinal movement of the nut, a collet carried in the forward end of said sleeve and threaded at its inner end, a threaded shaft engaging said collet and extending rearwardly through and beyond said sleeve and said hollow shaft, and means to turn both shafts to secure a drill in position and advance it.

6. In a centering machine, in combination, a frame, two carriages, one at least of which is longitudinally movable thereon, drill-heads, one on each carriage, a longitudinally movable and rotatable tool-holding spindle within each drill-head, a turnable shaft on each drill-head, means to convert the turning movement of each shaft into a longitudinal movement of its corresponding spindle, means to rotate said spindles in unison, independent means to turn the turnable shaft of one drill head, and driving connections extending from the last named shaft to the shaft of the other drill-head, whereby the operation of one shaft operates the other shaft.

7. In a centering machine, in combination, a frame, two carriages mounted thereon, drill-heads, one mounted on each carriage, a sleeve rotatable within each drill-head, a gear splined on said sleeve, a driving shaft, driving connections from the driving shaft to both gears whereby the sleeves are simultaneously rotated, a feed shaft on each drill-head rotatable on an axis coincident with that of the corresponding sleeve, connections from each feed shaft to the corresponding sleeve whereby the latter may be fed toward or from the work, and means independent of the driving connections for the sleeve for simultaneously rotating said feed shafts.

8. In a centering machine, in combination, a frame, two carriages mounted thereon, drill-heads, one mounted on each carriage, a sleeve rotatable within each drill-head, a gear splined on said sleeve, a driving shaft, driving connections from the driving shaft to both gears whereby the sleeves are simultaneously rotated, a rotatable and non-slidable feed shaft on each drill head, connections therefrom to the corresponding sleeve whereby the latter may be fed toward or from the work, a sprocket wheel on each feed-shaft, a counter shaft, two sprocket wheels thereon, and a sprocket chain connecting the sprocket wheel on each feed shaft with one of the sprocket wheels on the counter shaft.

9. In a centering machine, in combination, a frame, two carriages movable thereon, drill-holders between which said carriages are mounted, a pair of jaw-holders movably mounted on each carriage, a right and left hand threaded shaft turnable in bearings on each carriage, nuts threaded on said shaft, set screws on said jaw holders engaging said nuts, and centering jaws, one carried by each jaw-holder.

10. In a jaw holder for centering machines, in combination, a base, upright flanged side-plates, a jaw resting on the base between the side-plates, and a cap overlying and contacting with the jaw and bolted to the flanges of the side plates to clamp the jaw and hold it from lateral movement.

11. In a centering machine, in combination, a frame, two drill-holding end carriages one at least of which is longitudinally movable thereon, two intermediate carriages longitudinally movable thereon and adapted to support the piece to be drilled, drill-heads on the end carriages, drill spindles on the drill-heads, a driving shaft extending longitudinally of the frame, means driven by said shaft to rotate said spindles, a rotatable shaft on each drill-head, means connecting each drill-head shaft and its corresponding spindle to feed the latter longitudinally, hand-operated means to move said movable carriages, and independent hand-operated means to rotate the drill-head shafts in unison; whereby said movable carriages may be operated to position the piece to be drilled and the spindles operated to rotate them from the driving shaft and feed them toward the work by hand.

12. In a centering machine, in combination, a frame, two drill-holding end carriages one at least of which is longitudinally movable thereon, hand operated means engaging the frame and the movable carriage adapted to move the latter longitudinally into position to engage the end of the piece to be drilled, drill heads one on each carriage, a longitudinally movable and rotatable tool-holding spindle on each drill head, means to rotate said spindles in unison, and hand operated means to simultaneously feed said drills longitudinally upon their respective carriages.

13. In a centering machine, in combination, a frame, two drill-holding end carriages one at least of which is longitudinally movable thereon, two intermediate carriages longitudinally movable thereon and adapted to support the piece to be drilled, drill-heads on the end carriages, drill spindles on the drill-heads, hand operated means engaging the frame and the movable carriage adapted to move the latter longitudinally into position to engage the end of the piece to be drilled, means to rotate said spindles in unison, and hand-operated means to simultaneously feed said drills longitudinally upon their respective carriages.

14. In a centering machine, in combination, a frame, a rack extending longitudinally thereof, two drill holding end carriages one at least of which is longitudinally movable on the frame, a pinion carried by the movable carriage engaging said rack, means on the movable carriage to turn said pinion thereby feeding the movable carriage toward or from the work, drill heads one on each carriage, longitudinally movable and rotatable tool-holding spindles one on each drill head, a turnable shaft on each drill head, means to convert the turning movement of each shaft into a longitudinal movement of its corresponding spindle, a shaft extending longitudinally of the frame, connections between the last named shaft and the respective drill head shafts, and means to rotate the spindles in unison, whereby the spindles may be initially engaged with the work by turning said pinion and the spindles simultaneously fed forward during their rotation.

In testimony of which invention, I have hereunto set my hand, at Kennett Square, on this eighth day of May, 1908.

WILLIAM T. RUTH.

Witnesses:
EDWIN S. PHILIPS,
W. FRANK R. WHITTINGTON.